Aug. 4, 1953     E. R. MAURER     2,647,602
SYNCHRONIZED CENTRIFUGAL CLUTCH
Original Filed Feb. 19, 1945
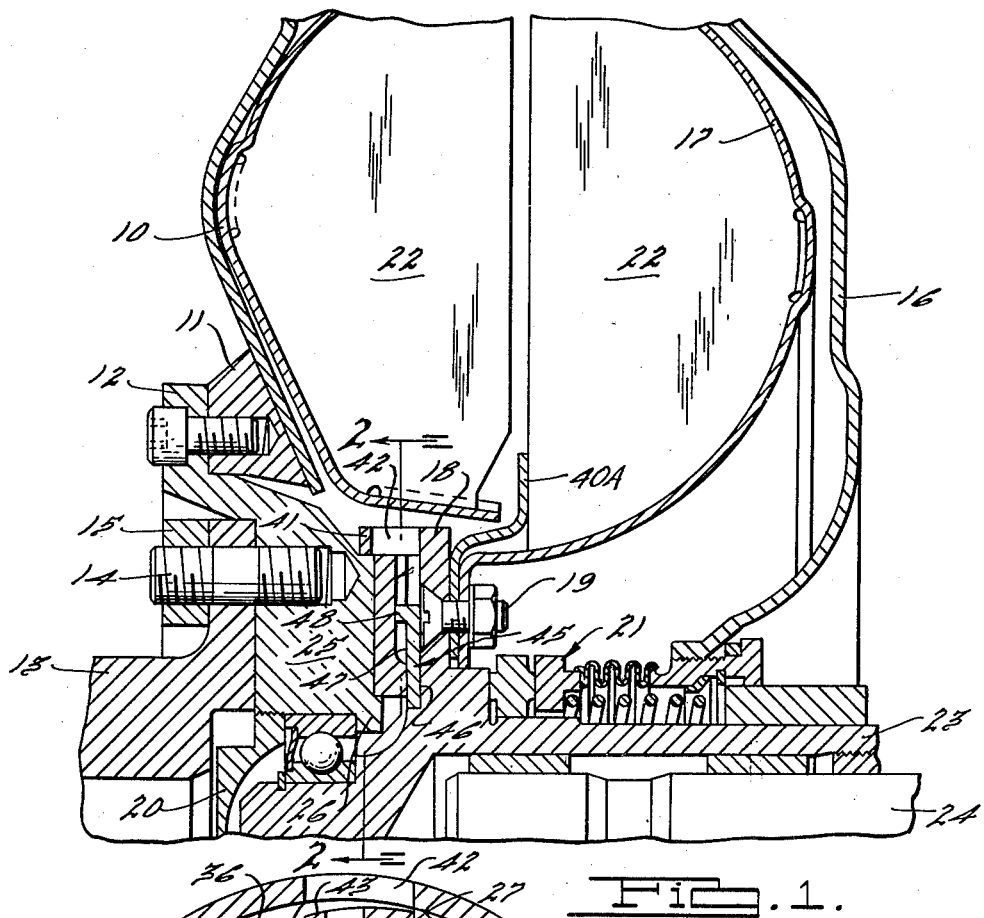
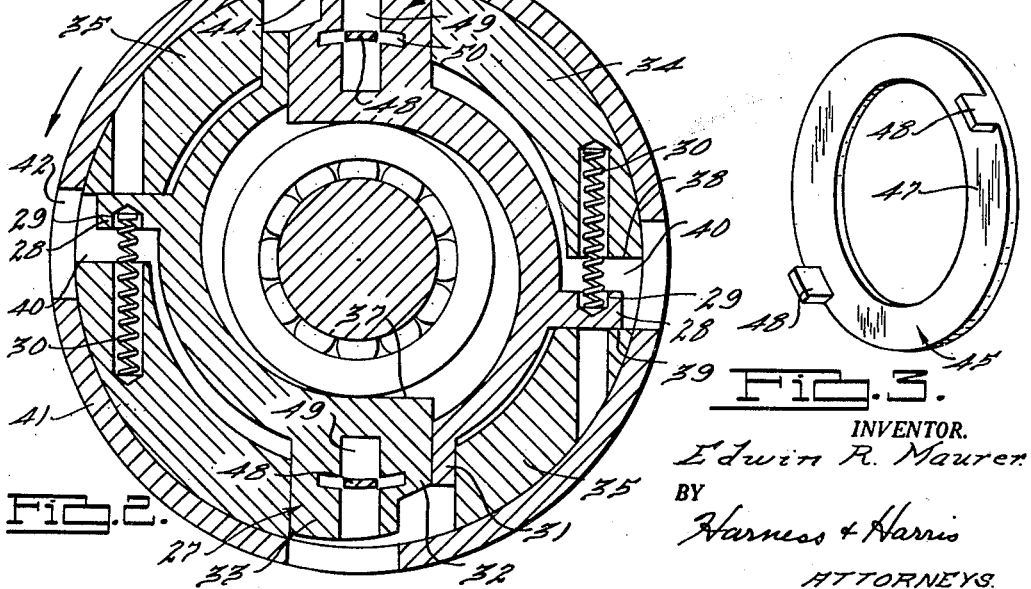
INVENTOR.
Edwin R. Maurer
BY
Harness & Harris
ATTORNEYS.

Patented Aug. 4, 1953

2,647,602

UNITED STATES PATENT OFFICE 2,647,602

SYNCHRONIZED CENTRIFUGAL CLUTCH

Edwin R. Maurer, Detroit, Mich., assignor to Chrysler Corporation, Highland Park, Mich., a corporation of Delaware Original application February 19, 1945, Serial No. 578,631. Divided and this application July 24, 1948, Serial No. 40,566

9 Claims. (Cl. 192—105)

This invention relates to power transmitting drives providing a pawl clutch of the centrifugal type engageable to drivingly connect a driving and a driven member. More particularly my invention has reference to centrifugal pawl clutch mechanism providing means for controlling the pawl engagement, for example, whereby it may be made operably responsive to certain predetermined conditions of operation of the drive structure with which the clutch mechanism is associated. The present application is a division of my copending application Serial No. 578,631, filed February 19, 1945, and now Patent Number 2,448,539, issued September 7, 1949.

My invention will be illustrated as applied to a centrifugally actuated pawl clutch mechanism for locking together against slip under certain conditions of vehicle operation a pair of fluid power transmitting elements, which clutch mechanism includes a driving member drivingly associated with one of said power transmitting elements, a driven member drivingly associated with the other of the power transmitting elements, a locking pawl carried by one of the members and operably responsive to centrifugal force upon predetermined rotation of said one member for interconnecting said clutch elements and means for preventing the operation of the clutch mechanism for positively locking together the fluid power transmitting elements until the rotative speeds of the clutch members have been first brought to approximate synchronism.

An object of the invention therefore, is to provide an automatically operable clutch mechanism with means operable in response to functioning of the power transmitting drive structure in which the clutch mechanism is incorporated for controlling engagement of the clutch mechanism.

Another object is to provide a centrifugal type pawl clutch mechanism for an automotive vehicle drive structure with blocker means operable automatically under certain conditions of vehicle functioning for positively preventing engagement of the pawl.

A more particular object is the provision of engagement control means for a centrifugal pawl clutch comprising a frictionally driven balk ring having laterally projecting fingers for interlocking with the pawl during asynchronous rotation of the driving and driven members of the clutch to prevent its engagement.

Other objects of my invention will be apparent from the following description and the drawing wherein:

Fig. 1 is a sectional elevation of a portion of a transmission embodying the present invention;

Fig. 2 is a sectional view taken along the line 2—2 of Fig. 1; and

Fig. 3 is an elevational view of the control ring of my invention shown in perspective.

Referring to Figs. 1 and 2, it will be seen that there is illustrated a fluid power transmitting device such as a fluid coupling having an impeller 10 provided with an annular ring 11 by which it is carried on a hub 12 which is fastened to an engine crankshaft 13 by means of studs 14 and nuts 15. The impeller includes a housing portion 16 which encloses a runner 17, the latter being welded to a hub 18 or fastened thereto by bolts 19. A forward seal 20 and a rearward seal 21 prevent leakage of the fluid which is circulated in the passages formed by the vanes 22, as is common in the art. The runner hub 18 has a tubular driven portion 23 by which drive is imparted to the input member of the vehicle transmission. This tubular portion as shown, pilots a transmission shaft 24. The impeller hub 12 serves as the pawl drive member of a centrifugal clutch, it having a rearward pawl carrying core portion 25 formed with a shoulder 26 and which is slotted to carry a pair of pawls 27. The pawls are movable radially outwardly in response to centrifugal force acting upon the pawls during rotation of the impeller hub 12. The pawls 27 are an element of the centrifugal clutch and have ears 28 provided with recesses 29 for receiving a coil compression spring 30 of predetermined force value which tends to keep the pawls in retracted, that is, disengaged position. The pawls are shaped, as illustrated, and each has an integral tail portion 31 which lies alongside a portion 32 of the head 33 of the pawl and acts as a dragging connection between the pawl and the hub 12 as well as a guide to keep the pawls in position. The pawl carrying core 25 is provided with rearwardly projecting annular segments 34, 35 which serve as guideways for the head 33 and tail 31 of the pawls and further provide the driving connection between the hub 12 and the pawls.

The pawls loosely embrace the core 25 and have sufficient clearance in slotted guideways 36 such that they can move radially outwardly under the influence of centrifugal force or be retracted by the spring 30. This movement is limited in both directions by engagement of the inner surface 37 of the pawls with the shoulder 26 of the pawl core 25 or by abutment of the pawl ears 28 with the adjacent faces 38, 39 of the annular segments 34, 35 respectively, which form a slot 40 for reception of the ear 28.

The springs 30 may be of any desired strength to produce the operating characteristics desired, it being understood that the springs will keep the pawls in the illustrated retracted position until a predetermined speed of the drive hub 12 is reached whereupon centrifugal force will overcome the force of the springs and the pawls will tend to move radially outwardly as explained below.

The runner hub 18 carries a baffle 40A for reducing the efficiency of the coupling at idling speed and for preventing surges and is formed with a forwardly projecting annular portion 41 constituting the driven member of the centrifugal clutch. The portion 41 is provided with circumferentially spaced notches or pawl-receiving recesses or openings 42. Four openings 42 are shown but more may be desired in some installations.

The openings 42 are shown radially aligned with the pawls 27 such that the pawls may if outwardly projected engage the openings 42 to positively lock the impeller hub 12 in drive with the runner hub 18. The pawls 27 are formed with an outer cammed surface 43 which is shaped such that when the pawls are urged outwardly by centrifugal force and the annular portion 41 of the runner hub 18 is rotated at a different speed than the impeller hub 12, the surface 43 will engage the edge 44 of the openings 42 and cam the pawls inwardly until the speeds of the two members are substantially synchronized, whereupon the pawls will enter the openings 42.

In operation of the device so far described, let it be assumed that the parts are in the position illustrated with the vehicle engine, hubs 12 and 18, and the shaft 24 at rest. The engine may be started in the normal manner and the vehicle may then be started, accelerated, maneuvered, etc., with the coupling elements slipping. When the vehicle has been accelerated to a predetermined cruising speed, for example, 25 M. P. H., the pawls 27 under the influence of centrifugal force, tend to move outwardly to engage the openings 42. They will be prevented from engaging the openings, however, so long as the rotative speeds of the pawls and the hub 18 are different as they normally will be because of the slip between the impeller and runner of the coupling. The driver can effect engagement of the pawls by momentarily releasing the engine throttle whereupon the impeller will drop in speed relative to the runner and the pawls will engage at the instant of synchronism between these members.

Unless some means be provided for positively blocking or locking up the pawls under non-synchronous conditions the pawls will ratchet by the pawl units or openings 42 to produce a noisy operation and wear, and under certain conditions even breakage of the pawls.

As a quickly acting means to positively block movement of the pawls into engagement under non-synchronous conditions of operation I have provided as shown a balking or blocking ring in the nature of a flat ring 45 carried on a shouldered annular flange 46 of the runner hub 18. This ring lies between the flange 46 and the pawls 27. The forward face 47 of the ring 45 serves to hold the pawls endwise in position. The ring 45 is further provided with opposite lateral projections 48 formed at the periphery of the ring 45 which are received and shown aligned with radial slots or wings 49 of a slotted portion in the pawls 27. The slots 49 extend inwardly sufficient to provide end clearance for the projection 48 of the ring in the engaged position of the pawls and outwardly sufficiently to provide end clearance at the retracted position of the pawls. As will be noted in Fig. 2, the pawls 47 are provided between the opposite ends of the radial slots 49 with intersecting circumferential slots or wings 50 which extend on the nether side of the radial slots 49 and in the retracted position of the pawls shown in Fig. 2 are circumferentially aligned with the projections 48 and are adapted to receive the projection 48 of the balking ring 45 upon any relative rotation between pawls and ring 45. The pawls 27 are free for radial movement by action of centrifugal force when the projection 48 is in the position shown in the drawing at which time the pawl heads 33 and openings 42 are also aligned. When, however, as in starting the vehicle from rest the impeller 10 is rotating faster than the runner such that the pawls will then also be rotating faster than the hub 18 of the runner the pawls will be rotating in the direction of the arrow in Fig. 2 and the right hand portion of the slot 50 of the upper pawl in Fig. 2 will embrace or engage the projections 48 of the balk ring 45 which is held from rotation by the frictional drag between the ring and the runner hub 18 thereby preventing further outward movement of the pawl 27. The slot 50 of the lower pawl will similarly engage the opposite projection 48 of the balk ring. Thereafter when the vehicle speed has reached a predetermined value providing sufficient centrifugal force for engaging the pawls, momentary release of the throttle control to permit the impeller to drop in speed relative to the runner and become synchronized therewith will effect a relative movement between the pawls and the projections 48 whereby the slots 50 will become disengaged from the projections 48 and the pawls may then be projected outwardly into engagement with the openings 42 of the runner hub 18. It will be understood that the flange portion 46 of the hub 18 and inertia of the ring 45 will impose a delaying action or drag on the ring 45 to facilitate relative movement between the slots 50 of the pawls and the projections 48.

The impeller and runner are now locked for conjoint operation without slippage so long as the impeller tends to overrun the runner as would be the case during normal driving of the vehicle by the engine. When the vehicle speed is reduced below the engaging speed of the pawls the latter will under urging by the springs 30 become disengaged from the openings 42. At this time the runner and the ring 45 which it carries will tend to rotate at a greater speed than the impeller 10 and pawls 27 thereby causing the projections 48 of the ring 45 to engage the left hand (Fig. 2) portion of the slots 50 of the disengaged pawls which is the opposite end from that engaged in effecting engagement of the pawls when speeding up the vehicle from rest. This engagement of the projections 48 will prevent outward movement of the pawls should the coast speed of the vehicle rise above the engaging speed of the pawls due to the driving of the pawls by the runner through the fluid of the coupling. Should the coast speed be then decreased to permit synchronous rotation of the runner and impeller the projections 48 will leave the slots 50 and permit the pawls to engage the openings 42 of the hub 18 to provide a positive drive under the coast operation of the vehicle.

It will be understood that I have provided a simple and desirable construction for retaining the pawls of a centrifugal clutch in a predetermined position until certain vehicle operating conditions have been reached in response to which such control means may release the pawls for engagement. Due to the juxtaposition of the projections 48 and opposite portions of the slots 50 the arrangement is quick acting in performing the described functions.

While the particular structures herein described are well adapted for carrying out the objects of the invention it will be understood that various modifications, changes, and substitutions may be made without departing from the spirit thereof, for example, various changes in the size, shape, and arrangement of the parts may be readily made by those skilled in the art. The present invention is, therefore, to be construed to include all such modifications, changes and substitutions.

I claim:

1. A power transmitting clutch mechanism comprising a driving member, a driven member, a centrifugally responsive pawl carried by one of said members, an annular portion on said other member having an opening therein for receiving said pawl at a predetermined rotative speed of said one member and substantially synchronous rotation of said members, intersecting slots on said pawl forming oppositely aligned wings and means for preventing engagement of said pawl in said opening during all asynchronous rotation of said members comprising a ring having constant frictional drive connection with said other member and having an axially extending lateral projection substantially paralleling the axis of rotation of said other member adapted for engagement and movement in said pawl slots.

2. A power transmitting clutch mechanism comprising a rotatable pawl carrying core, a rotatable shell member having a pawl receiving recess therein, a pawl carried by said core and movably responsive to centrifugal force upon rotation of said core to engage said recess for establishing a positive drive between said core and shell and means for preventing engagement of said pawl during all asynchronous rotation of said core and shell comprising a ring having frictional drive connection with said shell member, an axially extending lateral projection on said ring and slot means in said pawl for receiving said projection and permitting relative oscillation between said ring and pawl said slot means including intersecting radial and circumferential slots having oppositely aligned wings.

3. A power transmitting clutch mechanism comprising a rotatable pawl carrying core, a rotatable shell member having a pawl receiving recess therein, a pawl carried by said core and movably responsive to centrifugal force upon rotation of said core to engage said recess for establishing a positive drive between said core and shell and means for preventing engagement of said pawl during all asynchronous rotation of said core and shell member comprising a ring having constant frictional drive connection with said shell member, a lateral projection on said ring and a pair of intersecting recesses in a face of said pawl for receiving said projection, one recess being adapted to receive said projection during all asynchronous rotation of said core and shell member and the other adapted to receive said projection during engaging movement of said pawl.

4. A power transmitting clutch mechanism comprising a rotatable pawl carrying core, a rotatable shell member having a pawl receiving recess therein, a pawl carried by said core and movably responsive to centrifugal force upon rotation of said core to engage said recess for establishing a positive drive between said core and shell and means for preventing engagement of said pawl during asynchronous rotation of said core and shell comprising a ring having constant frictional drive connection with said shell member, a laterally extending lug on said ring paralleling the core axis, a radially directed recess on said pawl for receiving said lug and a second recess substantially normal to said radial recess for receiving said lug said second recess cutting across said radial recess intermediate its length.

5. A power transmitting clutch mechanism as claimed in claim 2 wherein there is a pair of oppositely movable pawls and wherein said ring has diametrically opposite lateral projections.

6. A power transmitting clutch mechanism comprising a driving member, a driven member, said driving member having a pawl carrying core, and said driven member having a cup-shaped portion, the side wall of which surrounds said core, a pawl carried by said core and movably responsive to centrifugal force upon rotation of said driving member, a recess in said side wall of said cup-shaped portion for interengaging with said pawl to establish a positive driving connection between said drive and driven members, a shouldered face in the bottom of said cup, a balk ring mounted in frictional drive relationship to said face, a lug on said ring and a pair of intersecting recesses on said pawl for receiving said lug said recesses crossing each other so as to have opposite aligned portions.

7. A power transmitting clutch mechanism comprising coaxial driving and driven members, a centrifugally responsive pawl carried by one of said members, an annular portion on said other member having a pawl receiving opening therein, a pawl blocking ring carried by said other member and having a constant frictional drive connection therewith, a lateral blocking lug on said ring extending toward said pawl-carrying member, a radial slot on said pawl for receiving said lug, said slot having a length permitting engaging and disengaging movement of said pawl and a second slot on said pawl intersecting said first mentioned slot intermediate the length of the latter, said second slot permitting relative oscillatory movement between said pawl and ring and having stop abutments at the opposite ends thereof for limiting said relative movement and for preventing engaging movement of said pawl with said opening.

8. In a fluid power transmitting mechanism, having a vaned driving element, a vaned driven element, clutch means for effecting a positive drive between said elements comprising a pair of centrifugally responsive pawls rotatably carried by one element, a slotted shell carried by the other element adapted to receive a pawl to positively connect said elements in drive, said pawls having lateral faces, and means to maintain disengagement of the pawls during fluid drive of the elements and asynchronous rotation of said elements comprising a ring in frictional drive engagement with said other element, a lateral projection on said ring and a slotted portion in a lateral face of a pawl constantly engaging said projection, said slotted portion having a radial wing in which said projection may move when effecting engagement of the pawl and having circumferential wings on each side of said radial wing adapted to receive said projection during all asynchronous rotation of said elements when below the engaging speed of said pawl whereby to prevent engagement of the pawl with the shell under continuous asynchronous rotation of the elements to above the engaging speed of the pawls.

9. A power transmitting clutch mechanism comprising a driving member, a driven member, a centrifugally responsive pawl carried by one of said members, an annular portion on said other member having an opening therein for receiving said pawl at a predetermined rotative speed of said one member and substantially synchronous rotation of said members and means for preventing engagement of said pawl in said opening during all asynchronous rotation of said members comprising a ring having frictional drive connection with said other member and having a lateral finger-like projection substantially paralleling the axis of rotation of said other member adapted for positive interengagement with a recess portion of said pawl when the pawl is rotatably faster than said other member or said other member is rotatably faster than said pawl.

EDWIN R. MAURER.

References Cited in the file of this patent

UNITED STATES PATENTS

| Number | Name | Date |
|---|---|---|
| 2,194,787 | Dunn | Mar. 26, 1940 |
| 2,210,668 | Hopkins | Aug. 6, 1940 |
| 2,278,623 | Orr | Apr. 7, 1942 |
| 2,313,717 | Armantrout | Mar. 16, 1943 |
| 2,360,710 | Nutt | Oct. 17, 1944 |
| 2,448,539 | Maurer | Sept. 7, 1948 |